US012358092B2

(12) United States Patent
Ishibashi et al.

(10) Patent No.: US 12,358,092 B2
(45) Date of Patent: Jul. 15, 2025

(54) TEMPERATURE CONTROL DEVICE FOR MACHINE TOOL

(71) Applicant: MAKINO MILLING MACHINE CO., LTD., Tokyo (JP)

(72) Inventors: Kiyoteru Ishibashi, Yamanashi (JP);
Junya Omata, Yamanashi (JP);
Kenichi Fujikawa, Yamanashi (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 18/576,562

(22) PCT Filed: Jun. 29, 2022

(86) PCT No.: PCT/JP2022/026074
§ 371 (c)(1),
(2) Date: Jan. 4, 2024

(87) PCT Pub. No.: WO2023/282155
PCT Pub. Date: Jan. 12, 2023

(65) Prior Publication Data
US 2024/0316712 A1    Sep. 26, 2024

(30) Foreign Application Priority Data

Jul. 6, 2021    (JP) ................. 2021-112083

(51) Int. Cl.
*B23Q 11/14*    (2006.01)
*B23Q 11/12*    (2006.01)
(52) U.S. Cl.
CPC .......... *B23Q 11/141* (2013.01); *B23Q 11/127* (2013.01)
(58) Field of Classification Search
CPC ... B23Q 11/141; B23Q 11/127; B23Q 11/126; Y02P 70/10

(Continued)

(56) References Cited

U.S. PATENT DOCUMENTS 3,480,076 A    11/1969 Tomita
3,729,064 A *   4/1973 Wolf .................. F16N 39/00
                                                  184/104.1

(Continued)

FOREIGN PATENT DOCUMENTS

EP    1927431 A1    6/2008
JP    H01-306147 A  12/1989

(Continued)

OTHER PUBLICATIONS

International Search Report for International Patent Application No. PCT/JP2022/026074 (Aug. 9, 2022).

*Primary Examiner* — Henry Y Liu
(74) *Attorney, Agent, or Firm* — Merchant & Gould P.C.

(57) ABSTRACT

A temperature control device includes a machine body temperature sensor which measures a machine body temperature at a portion separated from a spindle device, a return oil temperature sensor which measures a temperature of cooling oil which circulates in a machine tool and which is collected by the temperature control device, an oil controller which includes at least two oil control modules, each having a cooler and which control the temperature of the cooling oil so that the temperature of the cooling oil detected by the return temperature sensor is synchronized with a reference temperature set based on a machine body temperature, in which tanks thereof communicate with each other, and the at least two oil control modules are connected in parallel to the machine tool, and a piping connection manifold for uniformizing convergence of the cooling oil to the machine tool and branching to each of the oil control modules.

6 Claims, 3 Drawing Sheets

(58) Field of Classification Search
USPC .......................................................... 184/6.22
See application file for complete search history.

(56) References Cited

U.S. PATENT DOCUMENTS

| | | | | |
|---|---|---|---|---|
| 4,006,944 A * | 2/1977 | Ando | ........................ | F16N 7/38 384/466 |
| 4,541,738 A * | 9/1985 | Leibensperger | .... | F16C 33/6681 384/473 |
| 5,101,885 A * | 4/1992 | Drake | ........................ | F15B 1/26 165/47 |
| 5,465,810 A * | 11/1995 | Peterson | ................. | F16N 39/00 184/6.21 |
| 5,485,895 A * | 1/1996 | Peterson | .............. | C10M 177/00 184/104.1 |
| 5,549,177 A * | 8/1996 | Hosokawa | ................. | F16N 7/40 184/104.1 |
| 5,971,068 A * | 10/1999 | Ochiai | ............... | G05D 23/1904 165/300 |
| 6,446,449 B2 * | 9/2002 | Krauter | ................ | B23Q 11/141 62/434 |
| 7,232,518 B2 * | 6/2007 | Wilkendorf | ............ | F15B 21/041 210/120 |
| 7,568,275 B2 * | 8/2009 | Jensen | ................... | B25B 11/005 269/21 |
| 7,886,560 B2 * | 2/2011 | Cook | ........................ | H05B 6/14 62/430 |
| 7,997,385 B2 * | 8/2011 | Yanohara | ............. | F16C 33/6625 409/56 |
| 8,079,788 B2 * | 12/2011 | Murota | .............. | B23Q 11/0891 409/137 |
| 9,126,301 B2 * | 9/2015 | Meidar | .................. | B23Q 3/155 |
| 9,475,165 B2 * | 10/2016 | Meidar | .................. | B23Q 3/155 |
| 9,511,465 B2 * | 12/2016 | Yamanishi | ............ | B23Q 11/126 |
| 10,118,268 B2 * | 11/2018 | Saito | .................... | B23Q 11/141 |
| 10,245,697 B2 * | 4/2019 | Sogabe | ................. | G05B 19/18 |
| 10,252,391 B2 * | 4/2019 | Yamanishi | ........... | B23Q 11/128 |
| 10,406,643 B2 * | 9/2019 | Li | ......................... | B23Q 11/10 |
| 10,766,112 B2 * | 9/2020 | Nakamura | ............... | B23Q 5/10 |
| 11,148,241 B2 * | 10/2021 | Kawada | ................... | B23Q 1/70 |
| 11,794,297 B2 * | 10/2023 | Li | ............................ | B23C 5/28 |
| 2002/0002832 A1 * | 1/2002 | Krauter | ................ | B23Q 11/141 62/185 |
| 2008/0111290 A1 * | 5/2008 | Jensen | ................... | B25B 11/005 269/21 |
| 2008/0247835 A1 * | 10/2008 | Murota | .............. | B23Q 11/0046 409/134 |
| 2009/0205811 A1 * | 8/2009 | Cook | .................... | B23P 11/027 165/80.5 |
| 2013/0177363 A1 * | 7/2013 | Meidar | .............. | B23Q 11/1053 409/131 |
| 2013/0248292 A1 * | 9/2013 | Mordukhovich | ....... | F16N 39/00 184/6.12 |
| 2014/0010611 A1 * | 1/2014 | Yamanishi | ........... | B23Q 11/127 409/135 |
| 2015/0290758 A1 * | 10/2015 | Liang | ................... | B23Q 11/141 62/98 |
| 2015/0343587 A1 * | 12/2015 | Meidar | .............. | B23Q 11/1061 409/136 |
| 2016/0076794 A1 * | 3/2016 | Saito | .................... | B23Q 11/146 62/6 |
| 2016/0121445 A1 * | 5/2016 | Sogabe | ................. | G05B 19/18 409/135 |
| 2017/0043441 A1 * | 2/2017 | Yamanishi | ........... | B23Q 11/128 |
| 2018/0043491 A1 * | 2/2018 | Nakamura | ............... | B23Q 5/10 |
| 2018/0071877 A1 * | 3/2018 | Li | ...................... | B23Q 11/1076 |
| 2021/0101234 A1 * | 4/2021 | Kawada | ............... | F16C 37/007 |
| 2022/0143769 A1 * | 5/2022 | Li | ............................. | B23C 5/28 |
| 2022/0260290 A1 * | 8/2022 | Mimura | ............... | B23Q 11/146 |

FOREIGN PATENT DOCUMENTS

| | | |
|---|---|---|
| JP | H05-79458 B2 | 11/1993 |
| JP | H07-266186 A | 10/1995 |
| JP | H09-136244 A | 5/1997 |
| JP | 2008-030169 A | 2/2008 |
| JP | 2010-105056 A | 5/2010 |
| JP | 2011-073108 A | 4/2011 |
| JP | 2019-076999 A | 5/2019 |

* cited by examiner

TEMPERATURE CONTROL DEVICE FOR MACHINE TOOL

This application is a National Stage Application of International Patent Application No. PCT/JP2022/026074, filed Jun. 29, 2022, which claims benefit of priority to Japanese Patent Application No. 2021-112083, filed on Jul. 6, 2021, and which applications are incorporated herein by reference. To the extent appropriate, a claim of priority is made to each of the above disclosed applications.

FIELD

The present invention relates to a temperature control device for a machine tool which performs temperature control by circulating cooling oil to a heat-generating part of the machine tool.

BACKGROUND

Patent Literature 1 discloses a spindle temperature control device for a machine tool which circulates cooling fluid through a spindle device of the machine tool and maintains the spindle temperature of the spindle device at a target value, the spindle temperature control device comprising a first liquid temperature regulator and a second liquid temperature regulator arranged in series or in parallel in a coolant circulation path, storage means for storing in advance the relationship between the spindle rotation speed of the spindle device and the cooling capacity for compensating for heat generation corresponding to the spindle rotation speed, a first control means for operating the first liquid temperature regulator so as to obtain a cooling capacity stored in a storage means in accordance with the rotational speed of the spindle device, a spindle temperature detection means for detecting the spindle temperature of the spindle device, and a second control means for operating the second liquid temperature regulator so that the temperature detected by the spindle temperature detection means becomes the target value.

In the spindle temperature control device described in Patent Literature 1, during actual machining, the first liquid temperature regulator is operated (performing feedforward control) so that a pre-stored cooling capacity is generated to correspond to the rotational speed of the spindle device, the spindle temperature of the spindle device is detected, and the cooling capacity of the second liquid temperature regulator is adjusted (feedback control is performed) so that the detected temperature becomes the target value. However, if cooling capacity is controlled in accordance with spindle rotation speed in the manner of the spindle temperature control device described in Patent Literature 1, for example, when heavy cutting is performed for a long time in a medium/low rotation speed range, the cooling capacity is determined only by the rotation speed, even though the spindle generates a large amount of heat, and the first control means may underestimate the cooling capacity. Thus, if the spindle temperature rises and the second liquid temperature regulator is suddenly activated, there may be a time delay in cooling the spindle, causing a problem with the response of the temperature control.

CITATION LIST

Patent Literature

[PTL 1] Japanese Examined Patent Publication (Kokoku) No. H5-79458

SUMMARY

Technical Problem

An object of the present invention is to provide a temperature control device for a machine tool which improves the response of the temperature control, enables changes in cooling capacity specifications in immediate response to changes in machine tool specifications, and can facilitate expansion.

Solution to Problem

According to the present invention, there is provided a temperature control device for a machine tool which performs temperature control by circulating cooling oil to a heat-generating part of the machine tool, the temperature control device comprising a machine body temperature sensor which measures a machine body temperature at a portion of a machine body of the machine tool separated from the heat-generating part, a return oil temperature sensor which measures a temperature of the cooling oil which circulates in the machine tool and which is collected by the temperature control device, an oil controller, comprising at least two oil control modules each having a tank for accommodating the cooling oil, a pump for circulating the cooling oil, and a cooler for lowering the temperature of the cooling oil, the oil control modules configured to control the temperature of the cooling oil supplied to the machine tool such that the temperature of the cooling oil detected by the return temperature sensor is synchronized with a reference temperature set based on the machine body temperature, the oil control modules configured such that the respective tanks are in communication with each other and so as to be connected in parallel to the machine tool, and a piping connection manifold for uniformizing convergence of the cooling oil supplied from the oil controller to the machine tool and branching of the cooling oil collected from the machine tool to each of the oil control modules.

Advantageous Effects of Invention

According to the temperature control device for a machine tool according to the present invention, the oil controller can be configured by combining a plurality of oil control modules as a module. Thus, if cooling capacity specifications are changed due to machine tool specification changes, oil control modules constituting the oil controller can be easily added or removed, whereby it is possible to immediately respond to changes in cooling capacity required in response to changes in machine tool specifications. As a result, rather than changing the cooling capacity by modifying the oil controller or replacing it with a larger capacity oil controller, for example, cooling capacity can be changed easily and at low cost. Furthermore, in the oil control modules, each tank communicates with each other, and the oil control modules are connected in parallel to the machine tool. The temperature control device also has a piping connection manifold. Thus, it is possible to equalize the convergence of cooling oil supplied from the oil controller to the machine tool and the branching of cooling oil collected from the machine tool to each oil control module, and since the temperature of the cooling oil in each oil control module can be made uniform, the temperature control of the machine tool can be stably performed.

Unlike the spindle temperature control device described in Patent Literature 1, this oil control module does not combine separate oil control modules such as a feedforward control type first liquid temperature regulator and a feedback control type second liquid temperature regulator, whereby cooling capacity specifications can be changed in immediate response to changes in machine tool specifications simply by adding an identical oil control module, and expansion is easy. Furthermore, unlike Patent Literature 1 wherein when the oil control module that is subjected to feedforward control is not sufficient, a feedback-controlled oil control module is used for supplementing it, all oil control modules of the present invention are controlled so that the temperature of the return oil (cooling oil) is synchronized at the set reference temperature, i.e., the plurality of oil control modules are feedback-controlled, whereby temperature control can be performed with suitable response.

DESCRIPTION OF EMBODIMENTS

The temperature control device for a machine tool according to an embodiment will be described below with reference to the attached drawings. Identical or corresponding elements have been assigned the same reference signs, and duplicate descriptions thereof have been omitted. In order to facilitate understanding, the scales of the drawings have been modified in some cases.

Figure 1:
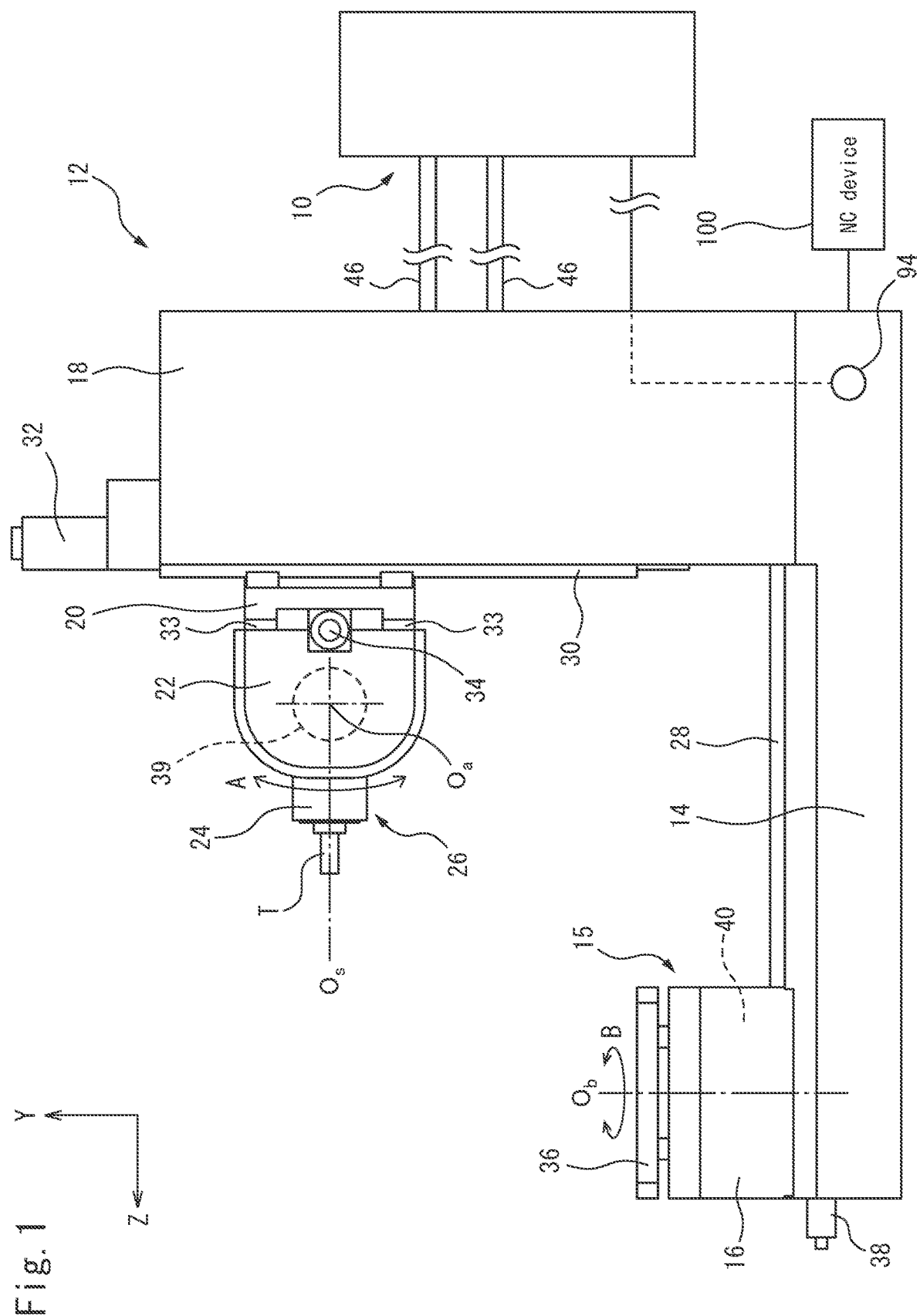
FIG. 1 shows a schematic side view of a machine tool in which a temperature control device according to the present embodiment is installed.

FIG. 1 shows a machine tool 12 comprising a temperature control device 10 according to the present embodiment. In the drawings, the arrows indicate the machine vertical direction and the machine longitudinal direction when the machine tool 12 is arranged on a horizontal plane. Y in the drawings indicates the upper side of the machine, and Z indicates the front side of the machine. Further, in the horizontal plane, the direction perpendicular to the machine longitudinal direction is referred to as the machine transverse direction (direction perpendicular to the paper surface of FIG. 1, X).

The machine tool 12 comprises a bed 14 as a machine body installed on a factory floor, a housing 16 of a rotary table 15 which is arranged on an upper surface of the bed 14 on the front side of the machine (left side in FIG. 1) so as to be movable in the machine frontward and rearward directions, a column 18 as a machine body which stands and is affixed on the upper surface of the machine rear side (the right side in FIG. 1) of the bed 14. The machine tool 12 further comprises a Y-axis slider 20 which is arranged on the front side of the column 18 so as to be movable in the machine vertical direction (Y-axis direction), an X-axis slider 22 which is arranged on the machine front side of the Y-axis slider 20 so as to be movable in the machine transverse direction (horizontal left/right directions), and a spindle device 26 (heat-generating part) which is attached to the X-axis slider 22 and has a spindle head 24 which rotatably supports the spindle.

The housing 16 is arranged so as to be reciprocable along a pair of Z-axis guide rails 28 extending along the machine longitudinal direction (Z-axis direction) on the upper surface of the bed 14, and a pallet 36 for affixation of a workpiece (illustration omitted) is attached to the upper surface of the housing 16. In the present embodiment, a motor 40 for driving the rotation of the pallet 36 is incorporated into the housing 16, and the pallet 36 is configured so as to be capable of rotating about a first axis Ob (B-axis direction) extending in the vertical direction.

In order to reciprocate the housing 16 along the Z-axis guide rails 28, a Z-axis feed device 38 (heat-generating part) comprising a ball screw shaft 38C (refer to FIG. 2) extending in the Z-axis direction, and a Z-axis servo motor connected to one end of the ball screw shaft 38C is arranged on the bed 14. A ball nut 38A (refer to FIG. 2) which engages with the ball screw shaft 38C is attached to the housing 16, and a bearing 38B which rotatably supports both ends of the ball screw shaft 38C are disposed on the bed 14.

The Y-axis slider 20 is configured so as to be reciprocable along a pair of Y-axis guide rails 30 extending in the machine vertical direction (vertical direction) on the front surface of the column 18. In order to reciprocate the Y-axis slider 20 along the Y-axis guide rails 30, a Y-axis feed device 32 (heat-generating part) comprising a pair of ball screw shafts 32C (refer to FIG. 2) extending in the Y-axis direction, and a Y-axis servo motor connected to one end, and in the present embodiment, the upper end, of each of the ball screw shafts 32C is arranged on the column 18. A ball nut 32A (refer to FIG. 2) which engages with the ball screw shaft 32C is attached to the Y-axis slider 20, and a bearing 32B that rotatably supports both ends of the ball screw shaft 32C in the column 18 is disposed.

The X-axis slider 22 is disposed on the front surface of the Y-axis slider 20 so as to be reciprocable along a pair of X-axis guide rails 33 extending in the machine transverse direction (X-axis direction). In order to reciprocate the X-axis slider 22 along the X-axis guide rails 33, an X-axis feed device 34 (heat-generating part) comprising a ball screw shaft 34C (refer to FIG. 2) extending in the X-axis direction, and an X-axis servo motor connected to one end of the ball screw shaft 34C is arranged on the Y-axis slider 20. A ball nut 34A (refer to FIG. 2) which engages with the ball screw shaft 34C is attached to the X-axis slider 22, and a bearing 34B which rotationally supports both ends of the ball screw shaft 34C is disposed on the Y-axis slider 20.

The X-axis slider 22 has a pair of A-axis arms that protrude forward in the Z-axis direction, and the spindle head 24 is supported between the A-axis anus so as to be rotatable about a tilt axis Oa (A-axis direction) parallel to the X-axis. An A-axis servo motor 39 for rotationally feeding the spindle head 24 about the tilt axis Oa (in the A-axis direction) is incorporated into one of the A-axis arms. The spindle head 24 is configured so as to support the spindle so as to be rotatable about the central axis Os. and to be capable of rotating the spindle by means of an incorporated servo motor (illustration omitted).

In this way, the machine tool 12 is configured to machine a workpiece by controlling linear motion along the X, Y, and Z axes and rotational motion about the Oa and Ob axes by means of an NC device 100, and moving the tool T attached to the tip of the spindle and the workpiece (illustration omitted) affixed to the pallet 36 and attached to the table 15 together with the pallet 36 relative to each other.

Figure 2:
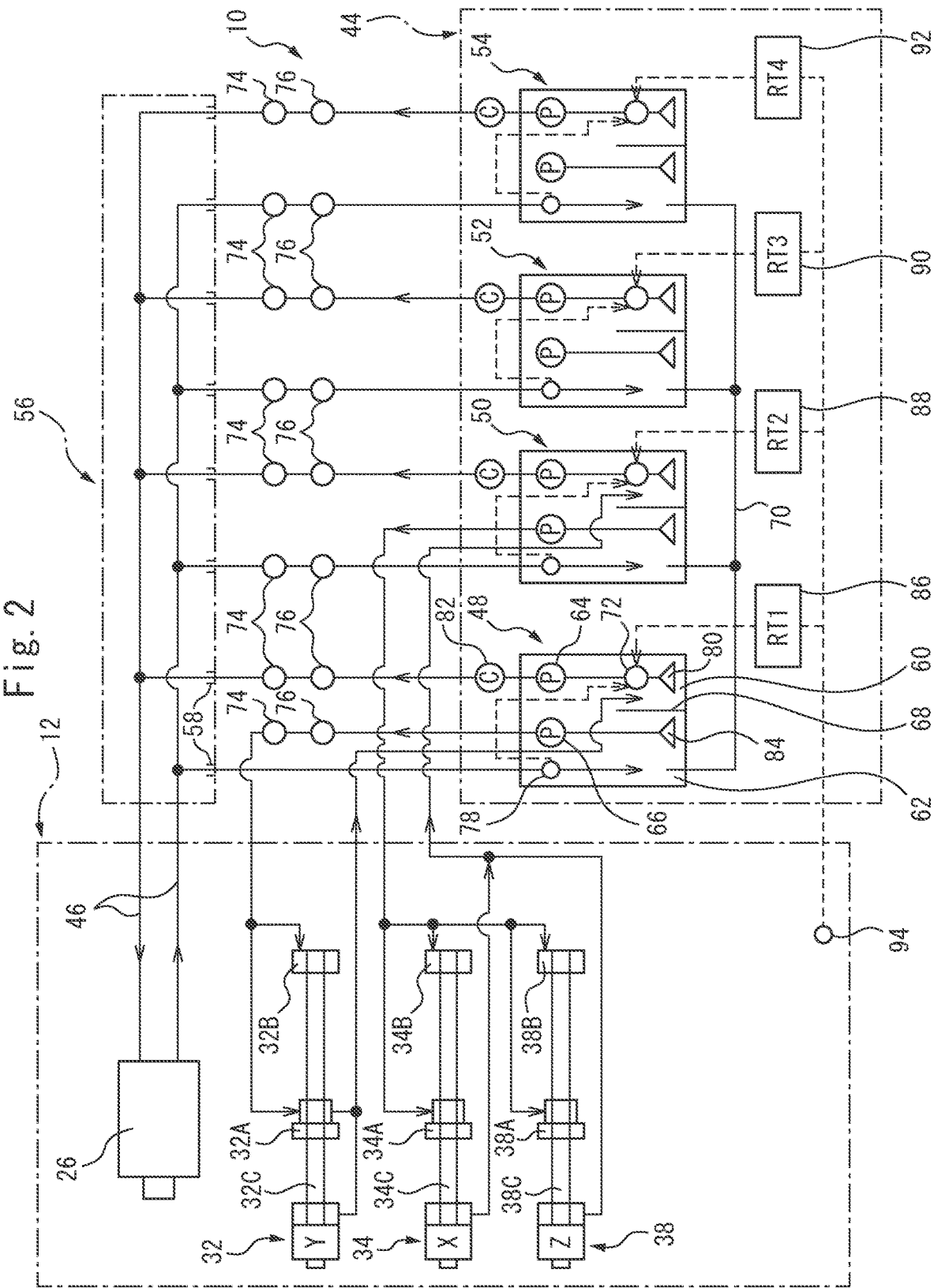
FIG. 2 shows a block diagram of the temperature control device according to the present embodiment.

FIG. 2 shows a block diagram of the temperature control device 10. The temperature control device 10 comprises an oil controller 44 for supplying cooling oil to the spindle device 26 and each axis feed device 32, 34, 38, which are heat-generating parts of the machine tool 12.

The oil controller 44 is configured to supply cooling oil to the bearing areas of the spindle device 26 and each axis feed device 32, 34, 38 through a circulation path (piping) 46 to cool the heat generated during rotation of each axis. The cooling methods for the spindle device 26 include jacket cooling in which cooling oil is circulated near the outer ring of the bearing which rotatably supports the spindle, jet oil lubrication in which lubricating oil is constantly injected from the side onto the rolling elements of the bearing which supports the spindle during rotation, and core cooling in which cooling oil is supplied through the spindle core, but the present invention is not limited to these cooling methods. Furthermore, cooling oil can be circulated to each feed device 32, 34, 38 by passing it through the ball nut, the ball screw, the bearing cases at both ends, and the core of the ball screw shaft. Alternatively, cooling oil may be passed only through the cases of the ball screw ends and the core of the ball screw shaft, i.e., the portions which generate heat the most. The oil controller 44 may circulate cooling oil inside large components such as the bed 14, the table 15, and the column 18 in order to make the temperature of the entire machine tool uniform.

The oil controller 44 comprises a plurality of oil control modules 48, 50, 52, 54 (hereinafter referred to as modules) connected in parallel to the circulation path 46 toward the spindle device 26. Herein, four modules 48, 50, 52, 54 including a first module 48, a second module 50, a third module 52, and a fourth module 54 are arranged. Each of the four modules 48, 50, 52, 54 has the same internal device and equivalent performance. These differ only in the presence or absence of connection with each feed device 32, 34, 38 and reference temperatures RT1 to RT4 (refer to FIG. 3) which are set to control the temperature of cooling oil, as will be described later. Note that though an aspect in which there are provided four modules 48, 50, 52, 54 is described, the invention is not limited to this, and more or fewer than four modules may be installed in accordance with changes in cooling capacity specification.

The four modules 48, 50, 52, 54 are connected in parallel to a piping connection manifold 56 arranged between the oil controller 44 and the spindle device 26. Specifically, the circulation paths 46 of the modules 48, 50, 52, 54 are connected to hose connection ports 58 of the piping connection manifold 56, and cooling oil is flowed (circulated) from the piping connection manifold 56 to the spindle device 26 via a single circulation path 46. Thus, cooling oil supplied from each module 48, 50, 52, 54 of the oil controller 44 to the spindle device 26 can be merged, and the cooling oil circulating through the spindle device 26 can be branched toward each module 48, 50, 52, 54. As a result, it is possible to make the flow of cooling oil circulating in the circulation path 46 connected to each module 48, 50, 52, 54 uniform. In particular, by arranging each pipe in the piping connection manifold 56 so that the pipe length between each hose connection port 58 and the spindle device 26 is equal, the discharge flow rate of each module 48, 50, 52, 54 can be made equal, and the flow rate of return oil to each module 48, 50, 52, 54 can be made equal.

A plurality of hose connection ports 58 are provided, and when the modules 48, 50, 52, 54 are not connected, they are configured to be sealed with plugs (illustration omitted). Note that though the piping connection manifold 56 is connectable to four modules 48, 50, 52, 54 herein, the piping connection manifold 56 is not limited to this and may be connected to more modules than four.

A first tank 60 and a second tank 62 for storing cooling oil, and a first pump 64 and a second pump 66 for circulating cooling oil are arranged inside each module 48, 50, 52, 54. A partition wall 68 is disposed between the first tank 60 and the second tank 62. The second tanks 62 of the modules 48, 50, 52, 54 are in communication via a tank communication path (piping) 70 in order to equalize the temperature of cooling oil (return oil) collected in each module 48, 50, 52, 54.

Furthermore, a cooler 72 for cooling the cooling oil and lowering its temperature is arranged on the first tank 60 side of each module 48, 50, 52, 54. The cooler 72 includes a refrigerant compressor, a heat exchanger, and an internal flow rate regulating valve connected in parallel to the refrigerant circulation path passing through these, which are not illustrated, and is configured to remove heat from the cooling oil coming into contact with the heat exchanger by circulating the refrigerant in the piping that connects the refrigerant compressor and the heat exchanger. These structures are the same as reference numerals 8, 9, 10, 11, and 12 in the drawings of Patent Literature 1, and thus, illustration thereof has been omitted. Furthermore, by reducing the opening degree of the internal flow rate regulating valve, it is easier for the refrigerant to circulate between the refrigerant compressor and the heat exchanger (increasing cooling capacity), and by increasing the valve opening degree, a bypass flow path is formed, making it difficult for the refrigerant to circulate between the refrigerant compressor and the heat exchanger (reducing cooling capacity).

The cooling oil having a temperature which has been increased by exchanging heat with the spindle device 26 is collected into the second tank 62 via the circulation path 46. A flow meter 74 for measuring the flow rate of cooling oil and a flow rate regulating valve 76 for adjusting the flow rate of cooling oil flowing through the circulating path 46 are attached to the circulation path 46 on the side where the collected cooling oil is branched from the hose connection port 58 of the piping connection manifold 56 and sent to each module 48, 50, 52, 54. A return oil temperature sensor 78 is attached to the circulation path 46 to detect (measure) the temperature of cooling oil (return oil) immediately after being collected in each module 48, 50, 52, 54.

The cooling oil that has flowed into the second tank 62 may mix with the cooling oil that has overflowed from the first tank 60 by climbing over the partition wall 68, or may overflow from the second tank 62 over the partition wall 68 and flow into the first tank 60, where it may be cooled by the cooler 72. The cooled cooling oil is drawn through a first filter 80 by the first pump 64 and sent to the spindle device 26. A check valve 82 for preventing backflow is attached to the circulation path 46 on the side where the cooled cooling oil is sent from each module 48, 50, 52, 54 to the piping connection manifold 56. A flow meter 74 for measuring the flow rate of the cooling oil and a flow rate regulating valve 76 for adjusting the flow rate of cooling oil flowing through the circulation path 46 are attached to the circulation path 46 on the piping connection manifold 56 side of the check valve 82. By adjusting the flow rate regulating valve 76 so that the values of all the flowmeters 74 are equal, the discharge flow rate of each module 48, 50, 52, 54 can be made equal, and the flow rate of the return oil to each module 48, 50, 52, 54 can be made equal. If the pipe lengths in the piping connection manifold 56 described above are equal, the flow meter 74 and the flow rate regulating valve 76 may not be provided.

The first module 48 is configured to also circulate cooling oil to the Y-axis feed device 32. The cooled cooling oil is drawn from the second tank 62 side by the second pump 66 through a second filter 84 and sent to the ball nut 32A side and the ball screw shaft sides 32B and 32C of the Y-axis feed device 32. The first module 48 is configured such that the cooling oil which circulates through these components is collected into the first module 48.

The second module 50 is configured to also circulate cooling oil to the X-axis feed device 34 and the Z-axis feed device 38. The cooled cooling oil is drawn from the second tank 62 side by the second pump 66 through the second filter 84, and is sent to the ball nut 34A, 38A side and the ball screw shaft side 34B, 34C, 38B, 38C of the X-axis feed device 34 and Z-axis feed device 38 connected in parallel to the circulation path 46. The second module 50 is configured such that the cooling oil that circulates through these components is collected into the second module 50.

Each module 48, 50, 52, 54 is electrically connected to a cooler 72 and a return oil temperature sensor 78 via the cooler 72, and are respectively connected to a first temperature setting device 86, a second temperature setting device 88, a third temperature setting device 90, and a fourth temperature setting device 92 as reference temperature setting means for controlling the operation of the cooler 72. Each temperature setting device 86, 88, 90, 92 is configured to be able to set reference temperatures RT1 to RT4, and so as to control the cooling capacity of the cooler 72 so that the temperature of the return oil is synchronized with the set reference temperatures RT1 to RT4. Specifically, each temperature setting device 86, 88, 90, 92 increases or decreases the cooling capacity of the cooler 72 by controlling the operation of the refrigerant compressor and internal flow rate regulating valve of the cooler 72.

A machine body temperature sensor 94 for monitoring the machine body temperature of the machine tool 12 is arranged in a portion of the machine body of the machine tool 12 on the rear side and the lower side of the machine (here, the bed 14 portion) at a portion distant from the spindle device 26 and each feed device 32, 34, 38. The machine body temperature sensor 94 is electrically connected to each temperature setting device 86, 88, 90, 92, and can automatically set the reference temperatures RT1 to RT4 of each temperature setting device 86, 88, 90, 92 based on the machine body temperature.

Each temperature setting device 86, 88, 90, 92 has an input panel (illustration omitted) on which numerical values can be entered from the outside for setting the reference temperatures RT1 to RT4, which can also be input from the NC program. This allows the reference temperatures RT1 to RT4 to be manually set instead of automatically setting them based on the machine body temperature. Note that the means for setting the reference temperatures RT1 to RT4 is not limited to an input panel, and may be manually variably set by providing a variable device such as, for example, a dial.

The mode of operation and effects of the temperature control device 10 according to the present embodiment will be described based on the time series of the temperature of the spindle device 26 in FIG. 3, which is shown as an example of the results of temperature control.

In this example, only first module 48 and second module 50 are activated, and third module 52 and fourth module 54 are not activated. In this manner, according to the temperature control device 10 according to the present embodiment, the number of modules 48, 50, 52, 54 to be activated in immediate response to the operating status of the machine tool 12 can be easily changed. Furthermore, in immediate response to changes in the specifications of the machine tool 12, it is possible to easily add and remove modules 48, 50, 52, 54.

Figure 3:
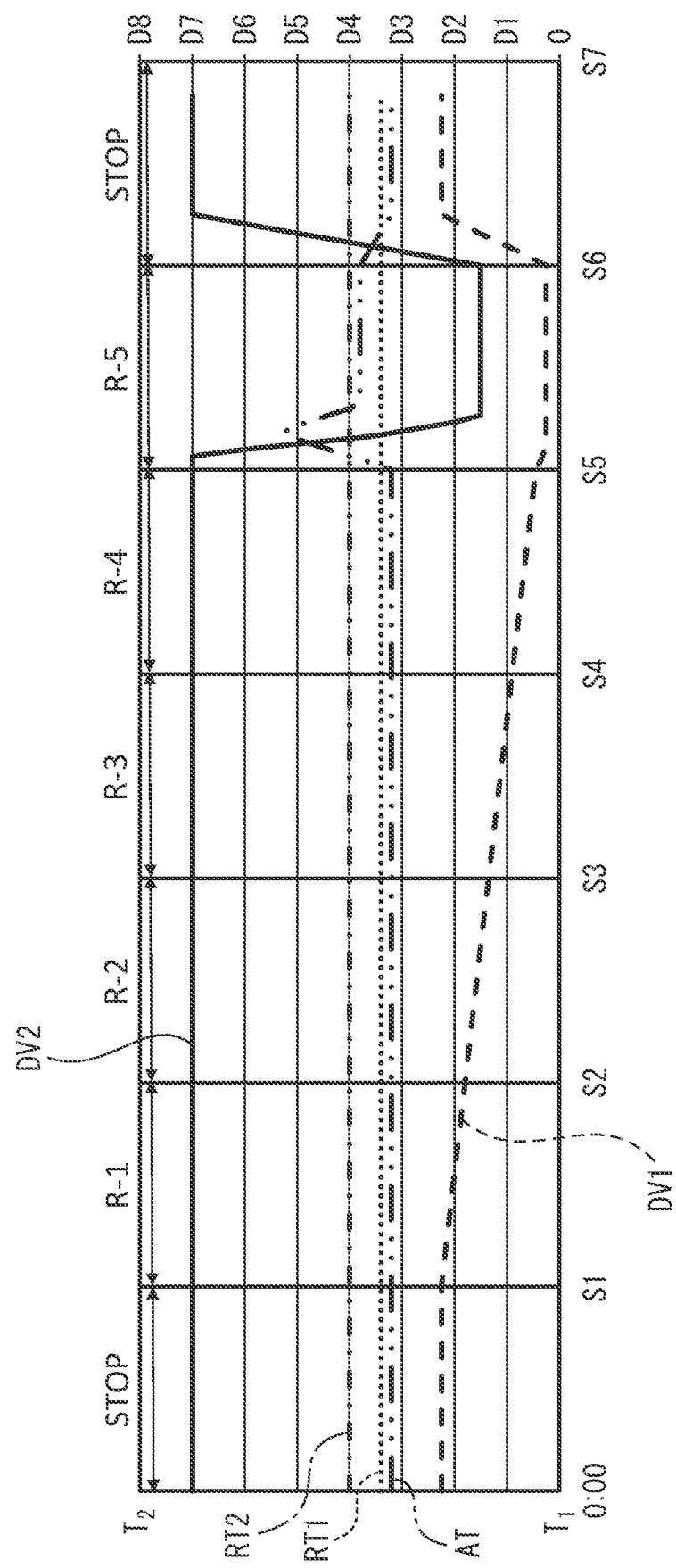
FIG. 3 shows a time series of the temperature of the spindle device as an example of the temperature control of the spindle device using the temperature control device according to the present embodiment.

The horizontal axis in FIG. 3 represents the time axis (times S1 to S7). The vertical axis represents temperature (from $T_1$ to $T_2$ on the left) displaying the reference temperature RT1 of the first module 48, the reference temperature RT2 of the second module 50, and the temperature AT of the return oil from the spindle device 26, as well as the valve opening degree (D1 to D8 on the right side) displaying the valve opening degree DV1 of the internal adjustment valve of the cooler 72 inside the first module 48 and the valve opening degree DV2 of the internal adjustment valve of the cooler 72 inside the second module 50.

In this example, the reference temperatures RT1 to RT4 of each module 48, 50, 52, 54 are such that the reference temperature RT1 of the first module 48 is set to be the lowest, and then the reference temperature RT2 of the second module 50 is set to the next lowest, and the reference temperature RT4 of the fourth module 54, which does not operate, is set to be the highest (RT4>RT3>RT2>RT1). The temperature difference between these reference temperatures RT1 to RT4 is the same temperature difference $\Delta T$ (in particular, RT4−RT3=RT3−RT2=RT2−RT1=$\Delta T$). Specifically, the reference temperature RT1 of the first module 48 is automatically set based on the machine body temperature of the machine tool 12 at a portion distant from the spindle device 26 and each of the feed devices 32, 34, 38 detected by the machine body temperature sensor 94. For example, the temperature may be 23° C., which is equivalent to the outside air temperature where the machine tool 12 is installed. Furthermore, theoretically, the smaller the temperature difference $\Delta T$ between the reference temperatures RT1 and RT4, the faster the second, third, or fourth module can operate, whereby temperature control response is improved. However, if the difference is excessively small, it may cause erroneous control such as the first and second modules operating at the same time, or the first module stopping and the second module operating. For example, it may be set to 0.2° C.

In the example shown in FIG. 3, the spindle device 26 is operated so as to increase the rotational speed of the spindle device (from R-1 to R-5 in the drawing) (R-5>R-4>R-3>R-2>R-1), and ultimately stop (STOP in the drawing). For example, R-1 has a speed of 3,000 revolutions per minute, and R-5 has a speed of 15,000 revolutions per minute. The spindle device 26 is operated in a fixed position. Thus, the feed devices 32, 34, 38 perform little operation other than slight movements to adjust the position of the spindle device 26. However, since the Y-axis servo motor of the Y-axis feed device 32 needs to support gravity, even if the feed axis appears to be stopped, the Y-axis servo motor operates and generates heat, whereby the cooling oil that circulates through the Y-axis feed device 32 is warmer than other feed devices.

Immediately after the spindle device 26 begins to operate, only the cooler 72 of the first module 48 is operating, and the cooler 72 of the second module 50 is not operating. Thus, the valve opening degree DV2 of the second module 50 remains at a large value (D7) and does not change. Conversely, since the amount of heat generated increases with the increase in the rotational speed of the spindle device 26, the valve opening degree DV1 of the first module 48 is reduced from approximately D2 to approximately 0 due to the operation of the internal flow rate regulating valve by the first temperature setting device 86 (cooling capacity is increased).

When the rotation speed of the spindle device 26 further increases (rotation speed R-5 after time S5), the cooling capacity of the cooler 72 of the first module 48 cannot cope with the further increased heat generation, and the temperature AT of the return oil rises rapidly. As a result, the temperature AT of the return oil exceeds the reference temperature RT1 of the first module 48 and the reference temperature RT2 of the second module 50. Thus, the cooler 72 of the second module 50 is operated by the second temperature setting device 88, and the valve opening degree DV2 of the internal flow rate regulating valve of the second module 50 is reduced from D7 to below D2 (the cooling capacity is increased). As a result, the temperature AT of the return oil is reduced to below the reference temperature RT2 of the second module 50. Furthermore, in the case of a spindle device with a high spindle rotation speed, for example, 20,000 revolutions per minute, four modules 48, 50, 52, 54 are required. In this case, the temperature control is as described above, and when the temperature AT of the return oil exceeds the reference temperature RT3 of the third module 52, the third module 52 is activated, and when the temperature control exceeds the reference temperature RT4 of the fourth module 54, the fourth module 54 is activated. Since the heat generation of the feed devices 32, 34, and 38 does not depend on the rotational speed of the spindle device 26, the third module 52 and fourth module 54 do not circulate cooling oil to the feed devices 32, 34, and 38, and piping sections that are not in use will be plugged.

According to the temperature control device 10 according to the present embodiment, the oil controller 44 can be configured by combining (modularizing) each of the modules 48, 50, 52, 54. Thus, even if the specifications of the cooling capacity are changed due to a change in the specifications of the machine tool 12, or even if the temperature AT of the return oil suddenly increases due to the operating status of the machine tool 12, it is possible to immediately respond to the change in the cooling capacity. As a result, it is possible to change the cooling capacity simply and at low cost, for example, without permanently installing a large-capacity oil controller. Further, each tank 60, 62 of each module 48, 50, 52, 54 is in communication with each other, and the modules 48, 50, 52, and 54 are connected in parallel to the machine tool 12. The temperature control device 10 also includes a piping connection manifold 56. Thus, it is possible to equalize the convergence of the cooling oil supplied from the oil controller 44 to the machine tool 12 and the branching of the cooling oil collected from the machine tool 12 to each module 48, 50, 52, 54, whereby the temperature of the cooling oil of each module 48, 50, 52, 54 can be made uniform, and the temperature control of the machine tool 12 can be stably performed.

As described above, the temperature control device 10 according to the present embodiment allows the specifications of the cooling capacity to be changed immediately in response to changes in the specifications of the machine tool 12, and also facilitates expansion. The oil controller 44 according to the present embodiment does not require one large-sized oil controller that has a cooling capacity equivalent to two, three, or four modules. First, it is sufficient to operate one module, and then operate the second, third, and fourth modules as necessary, resulting in an energy-saving effect. Additionally, since there is no need to keep large oil controllers in stock, management costs can be reduced.

Note that though an aspect in which the first module 48 is configured to also circulate cooling oil to the Y-axis feed device 32, and the second module 50 is configured to also circulate cooling oil to the X-axis feed device 34 and the Z-axis feed device 38 has been described, the present invention is not limited to this. For example, various aspects for connecting the modules and feed devices, such as an aspect in which the first module circulates cooling oil to the X-axis feed device and the Z-axis feed device, and the first module circulates cooling oil to the Y-axis feed device, may be adopted depending on the required cooling capacity.

Though an aspect in which the temperature control device 10 is applied to the machine tool 12 of the form shown in FIG. 1, which comprises the spindle device 26 and each axis feed device 32, 34, 38, has been described, it may also be applied to other types of machine tools such as lathes, grinders, etc.

Though the embodiments of the temperature control device 10 of the machine tool 12 has been described, the present invention is not limited to the above embodiments. Various modifications to the embodiments described above are included in the embodiments of the present invention within the scope which could be understood by a person skilled in the art.

DESCRIPTION OF REFERENCE SIGNS

10 temperature control device
12 machine tool
14 bed (machine body)
18 column (machine body)
26 spindle device (heat-generating part)
32 Y-axis feed device (heat-generating part)
34 X-axis feed device (heat-generating part)
38 Z-axis feed device (heat-generating part)
44 oil controller
48 first module (oil control module)
50 second module (oil control module)
52 third module (oil control module)
54 fourth module (oil control module)
56 piping connection manifold
60 first tank
62 second tank
64 first pump
66 second pump
72 cooler
78 return oil temperature sensor
86 first temperature setting device (reference temperature setting means)
88 second temperature setting device (reference temperature setting means)
90 third temperature setting device (reference temperature setting means)
92 fourth temperature setting device (reference temperature setting means)
94 machine body temperature sensor
RT1 reference temperature
RT2 reference temperature

The invention claimed is:

1. A temperature control device for a machine tool which performs temperature control by circulating cooling oil to a heat-generating part of the machine tool, the temperature control device comprising:
    a machine body temperature sensor which measures a machine body temperature at a portion of a machine body of the machine tool separated from the heat-generating part,
    a return oil temperature sensor which measures a temperature of the cooling oil which circulates in the machine tool and which is collected by the temperature control device,
    an oil controller, comprising at least two oil control modules each having a tank for accommodating the cooling oil, a pump for circulating the cooling oil, and a cooler for lowering the temperature of the cooling oil, the oil control modules configured to control the temperature of the cooling oil supplied to the machine tool such that the temperature of the cooling oil detected by the return temperature sensor is synchronized with a reference temperature set based on the machine body temperature, the oil control modules configured such that the respective tanks are in communication with each other and so as to be connected in parallel to the machine tool, and a piping connection manifold for uniformizing convergence of the cooling oil supplied from the oil controller to the machine tool and branching of the cooling oil collected from the machine tool to each of the oil control modules.

2. The temperature control device for a machine tool according to claim 1, wherein the reference temperatures of the at least two oil control modules are set with a difference, and one of the oil control modules has reference temperature setting means which is preferentially operated.

3. The temperature control device for a machine tool according to claim 2, wherein the reference temperature of one of the oil control modules that is preferentially operated is set to a lower temperature than the reference temperature of the other oil control module.

4. The temperature control device for a machine tool according to claim 2, wherein when the return oil temperature of the cooling oil exceeds the reference temperature of the one of the oil control modules that is preferentially operated, the other oil control module operates to prevent the return oil temperature of the cooling oil from exceeding each of the reference temperatures.

5. The temperature control device for a machine tool according to claim 2, wherein each of the reference temperatures of the plurality of oil control modules can be set by external input.

6. The temperature control device for a machine tool according to claim 1, wherein one of the oil control modules circulates the cooling oil to a spindle device of the machine tool, and the other oil control module circulates the cooling oil to the spindle device and a feed shaft device of the machine tool.

* * * * *